(12) United States Patent
Ranganathan et al.

(10) Patent No.: US 8,135,418 B2
(45) Date of Patent: Mar. 13, 2012

(54) METHOD AND BASE STATION FOR MANAGING CALLS IN WIRELESS COMMUNICATION NETWORKS

(75) Inventors: Murali Ranganathan, Phoenix, AZ (US); Thomas P. Emmons, Jr., Mesa, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 1203 days.

(21) Appl. No.: 11/861,792

(22) Filed: Sep. 26, 2007

(65) Prior Publication Data

US 2009/0082041 A1    Mar. 26, 2009

(51) Int. Cl.
*H04W 68/00* (2009.01)
(52) U.S. Cl. .............. 455/458; 455/422.1; 455/67.1; 455/561; 455/517; 455/209; 370/352
(58) Field of Classification Search .......... 370/352; 455/458, 422.1, 67.1, 561, 209, 517
See application file for complete search history.

(56) References Cited

U.S. PATENT DOCUMENTS

| 5,754,959 | A | 5/1998 | Ueno et al. |
| 6,240,298 | B1 | 5/2001 | Hayata |
| 6,539,206 | B1 * | 3/2003 | Min et al. ............... 455/67.11 |
| 2004/0205752 | A1 * | 10/2004 | Chou et al. ............... 718/100 |
| 2004/0208166 | A1 * | 10/2004 | Trabelsi et al. ........... 370/352 |
| 2005/0227718 | A1 * | 10/2005 | Harris et al. ............. 455/509 |
| 2009/0082041 | A1 * | 3/2009 | Ranganathan et al. ..... 455/458 |

FOREIGN PATENT DOCUMENTS

| WO | 0038444 | 6/2000 |
| WO | 2006113616 A1 | 10/2006 |

* cited by examiner

*Primary Examiner* — Michael Thier
*Assistant Examiner* — Julio Perez (57) ABSTRACT

A method for managing a plurality of call origination requests is provided. The method includes receiving (204) the plurality of call origination requests from a plurality of communication devices. Further, the method includes queuing (206) the plurality of call origination requests, based on a predefined policy, when a base station is operating in a congestion mode. Furthermore, the method includes processing (208) each call origination request of the plurality of call origination requests, based on the queued plurality of call origination requests.

12 Claims, 5 Drawing Sheets

METHOD AND BASE STATION FOR MANAGING CALLS IN WIRELESS COMMUNICATION NETWORKS

FIELD OF THE INVENTION

The present invention relates in general to the field of wireless communication networks, and more specifically, to a method and base station for managing calls in wireless communication networks.

BACKGROUND OF THE INVENTION

Wireless communication has become an integral part of everyday life in the world today. Every day, millions of people use their mobile phones, cordless phones or Personal Digital Assistants (PDAs) to communicate with their friends, business partners or family. Conventionally, wireless communication is made possible by the presence of wireless phones and base stations. To illustrate the process of wireless communication, consider a person, for instance, 'Tom', trying to call his friend 'Peter'. Tom dials Peter's phone number on his phone to establish a call session between Peter and himself. When Peter's phone number has been dialed, a 'request' goes to a base station, indicating that Tom is trying to call Peter through his phone. The base station serves this request and establishes the call session between Tom's and Peter's phones.

In events such as football games, natural disasters, terrorist attacks, etc., many people try to call their family or friends at the same time. Consequently, the base station receives many call requests simultaneously. Typically, a base station has a limit to the maximum number of requests it can serve at a particular time. For example, a base station may serve a maximum of 10 requests at a particular time. Now, in situations of high congestion, such as the break-time during football games or a terrorist attack, the number of requests received by the base station generally exceeds the maximum limit. Therefore, the base station has to reject some of these requests due to resource constraints. A person calling a friend in such a situation may receive a message that says, "The network is busy. Please call later." This may cause unnecessary trouble to the person who may have an urgent message for friends or family. Ideally, the base station should allow the maximum possible number of people to communicate with their families and friends in such situations.

In light of the foregoing discussion, there is a need for a method and apparatus for managing calls in wireless communication networks.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and base station for managing calls in wireless communication networks, in accordance with various embodiments of the present invention, it should be observed that the present invention resides primarily in combinations of method steps related to a method for managing calls in wireless communication networks. Accordingly, the system components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising', or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a' does not, without more constraints, preclude the existence of additional identical elements in the process, method, article or apparatus that comprises the element. The term 'another,' as used in this document, is defined as at least a second or more. The terms 'includes' and/or 'having', as used herein, are defined as comprising. The term 'another,' as used in this document, is defined as at least a second or more.

For an embodiment, a method for managing a plurality of call origination requests is provided. The method includes receiving the plurality of call origination requests from a plurality of communication devices. Further, the method includes queuing the plurality of call origination requests, based on a predefined policy, when a base station is operating in a congestion mode. Furthermore, the method includes processing each call origination request of the plurality of call origination requests, based on the queued plurality of call origination requests.

For another embodiment, a method for managing a call termination request for a communication device is provided. The method includes determining whether a base station is operating in a congestion mode. Further, the method includes adjusting a paging indicator power level on a paging channel, based on a parameter, when the base station is operating in the congestion mode. Furthermore, the method includes sending the call termination request to the communication device at the adjusted paging indicator power level via the paging channel.

For yet another embodiment, a base station is provided. The base station includes a processing unit which is configured to determine whether the base station is operating in a congestion mode. The processing unit is also configured to adjust a paging indicator power level on a paging channel, based on a parameter, when the base station is operating in the congestion mode. Further, the base station includes a transceiver which is configured to receive a plurality of call origination requests from a plurality of communication devices. The transceiver is also configured to send a call termination request to a communication device of the plurality of communication devices at the adjusted paging indicator power level.

Figure 1:
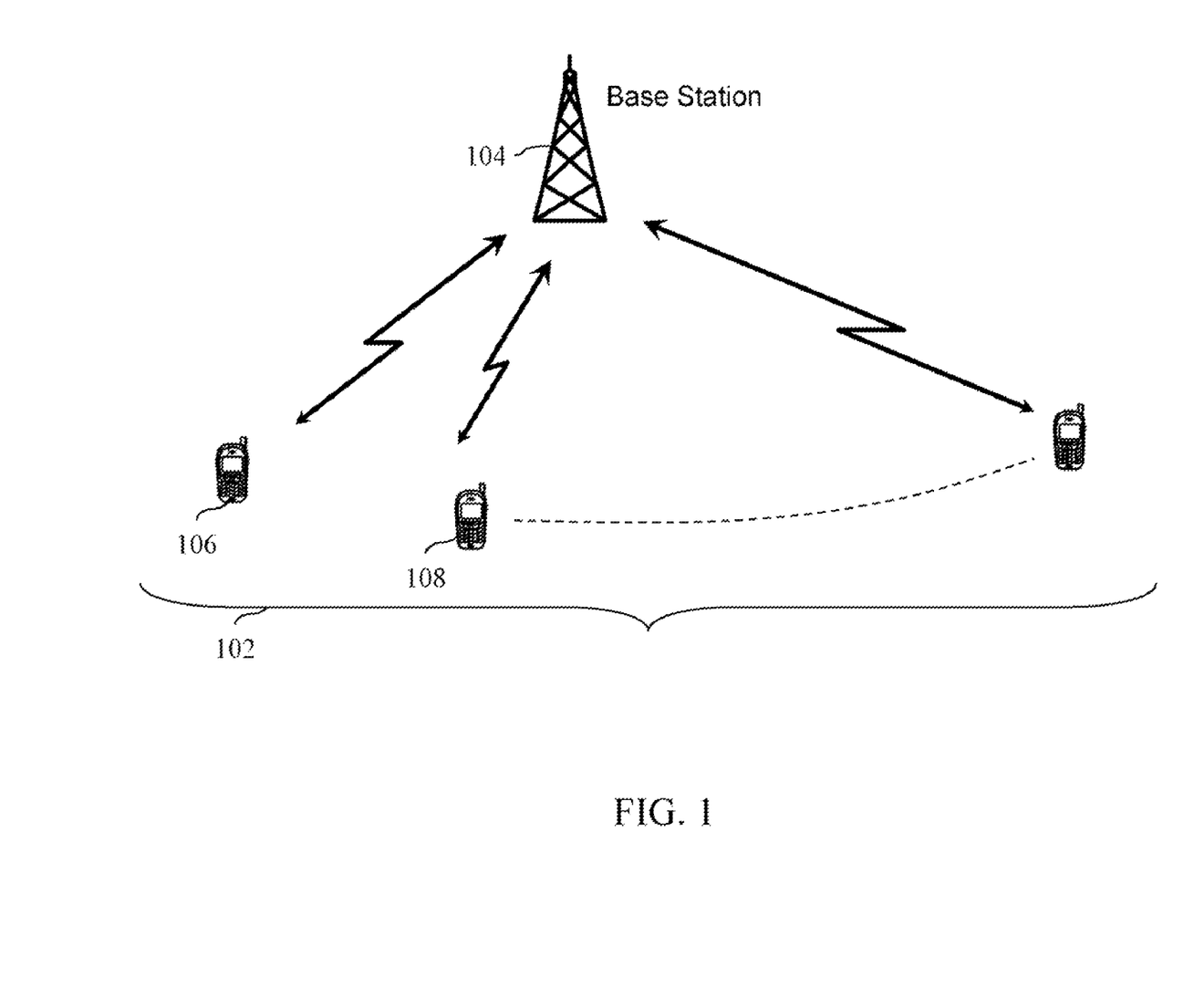
FIG. 1 illustrates a plurality of communication devices communicating with an exemplary base station, in accordance with various embodiments of the present invention.

FIG. 1 illustrates a plurality of communication devices 102 communicating with an exemplary base station 104, in accordance with various embodiments of the present invention. Examples of the plurality of communication devices 102 include, but are not limited to, mobile phones, cellular phones and Personal Digital Assistants (PDAs). Typically, each communication device of the plurality of communication devices 102 has a communication number assigned to it, and people interested in communicating with the users of these devices have to dial the corresponding communication numbers on their communication devices. For example, consider a situation where the user of a communication device 106 wants to communicate with the user of a communication device 108. The communication number of the communication device 108 can be, for example, '405-TAN-555'. To communicate with the user of the communication device 108, the user of the communication device 106 would need to dial the number '405-TAN-555' on the communication device 106.

As the user of the communication device 106 dials the number '405-TAN-555', a 'call request' or a 'call origination request' is received by the base station 104 from the communication device 106, indicating that the user of the communication device 106 wants to communicate with the user of the communication device 108. Typically, on receiving the call origination request, the base station 104 establishes the call session between the communication device 106 and the communication device 108. For one embodiment, the base station 104 sends a call termination request to the communication device 108, via a paging channel, before establishing the call session between the communication device 106 and the communication device 108. The paging channel can be, for example, the Quick Paging Channel (QPCH). The call termination request is sent via the paging channel at a particular paging indicator power level. If the communication device 108 is able to acknowledge to the call termination request at that paging indicator power level, only then is the call session established. This is better understood with the help of the following example.

Consider a case when the user of the communication device 106 dials the number '405-TAN-555', i.e., the communication number of the communication device 108, on the communication device 106. Consequently, a call origination request is received by the base station 104 indicating that the user of the communication device 106 wants to communicate with the user of the communication device 108. On receiving the call origination request, the base station 104 can send a call termination request to the communication device 108 via the QPCH at a paging indicator power level of, for instance, four units. If the communication device 108 is in a good network coverage area, the communication device 108 will be able to receive the call termination request at the paging indicator power level of four units. When the communication device 108 receives the call termination request, it can respond to it indicating to the base station 104 that the call termination request has been received by the communication device 108. The response made by the communication device 108 can be a predetermined signal or a message. Further, after receiving the response from the communication device 108, the base station 104 can establish the call session between the communication device 106 and the communication device 108. In one embodiment, the base station 104 can contact another base station to reach the communication device 108.

However, if the communication device 108 is not in a good network coverage area, the communication device 108 may not be able to receive the call termination request at the paging indicator power level of four units. For example, the communication device 108 may be in a network coverage area where the paging indicator power level needs to be eight units to receive any call termination request. In this event, the communication device 108 will not send any response to the base station 104, and thus no call session is established between the communication device 106 and the communication device 108.

In another embodiment, the base station 104 is said to be operating in congestion mode if there are many communication devices sending call origination requests simultaneously to the base station 104, i.e., if the number of communication devices sending the call origination requests to the base station 104 is greater than the maximum number of requests that the base station 104 can handle, the base station 104 is said to be operating in the congestion mode. For example, such situation may arise during football games, traffic accidents and natural or terrorist calamities. In such cases, the base station 104 may not be able to serve every call origination request that it receives. Consequently, the base station 104 rejects some of the call origination requests that it receives when it is operating in the congestion mode. However, the base station 104 starts serving the call origination requests again when it reverts to its normal working conditions, i.e., the base station 104 starts serving all the requests when the number of call origination requests it receives decreases below the maximum number of requests it can handle. This is better understood with the help of the following example.

Consider a situation when a terrorist attack has taken place and every user of the plurality of communication devices 102 tries to communicate with friends and/or families. Further, assume that the total number of communication devices in the plurality of communication devices 102 is 10, and the maximum number of requests the base station 104 can handle is eight. In such a case, the base station 104 will receive 10 call origination requests while its maximum handling capacity is eight. Consequently, the base station 104 will reject the last two call origination requests it receives. For example, the base station 104 can convey to the two communication devices that made the last two call origination requests that the base station 104 is functioning in the congestion mode and hence, their requests cannot be served. For one embodiment, the base station 104 may send a preset message to the two communication devices, indicating its congestion mode status. For example, the base station 104 may send a message, "Currently the network is busy. Please try again later." to the two communication devices.

Further, consider that after an hour of the terrorist attack, the number of call origination requests received by the base station 104 decreases to four. In this event, the base station 104 will start working in its normal mode and will serve every request it receives until it starts functioning in the congestion mode again.

Figure 2:
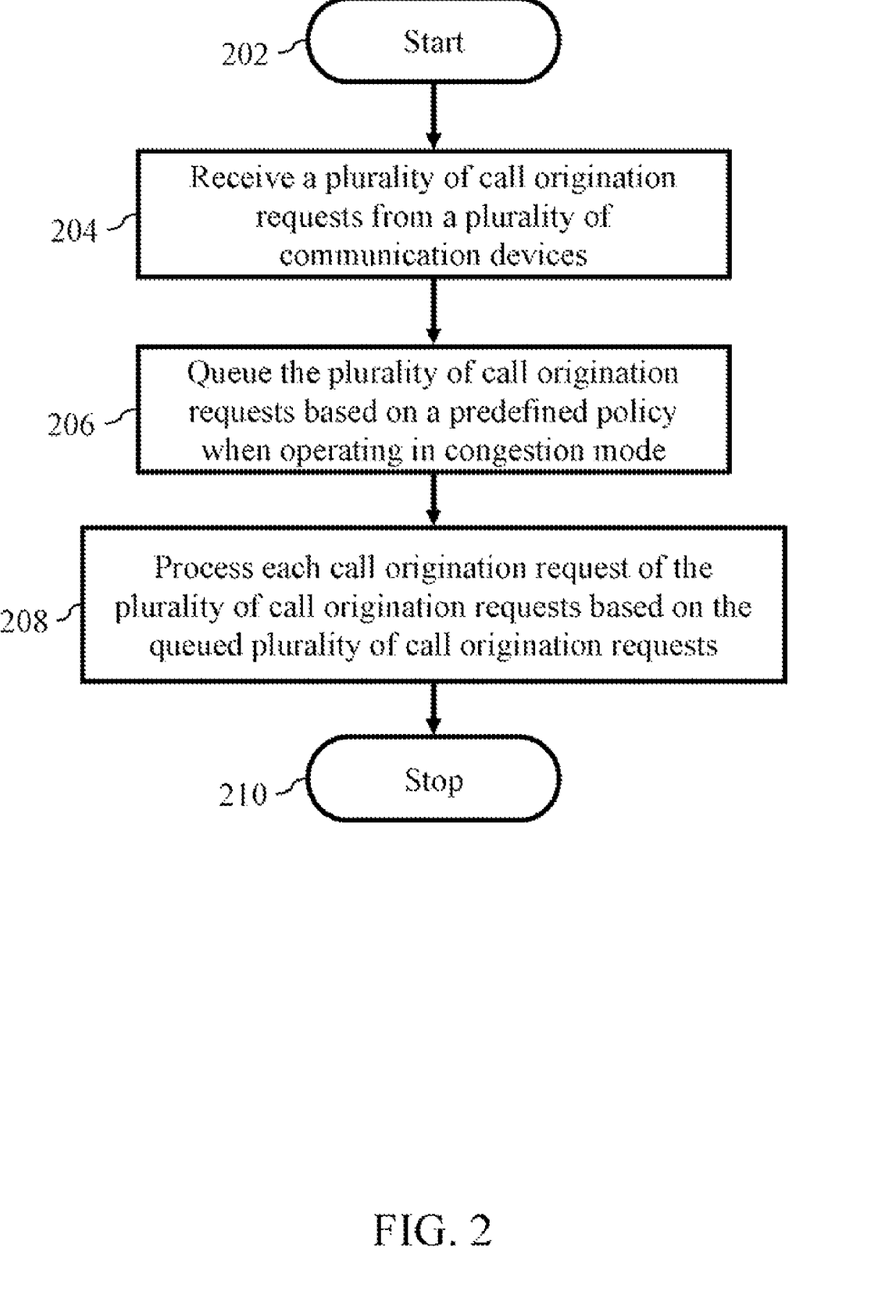
FIG. 2 is a flow diagram illustrating a method for managing a plurality of call origination requests, in accordance with various embodiments of the present invention.

FIG. 2 is a flow diagram illustrating a method for managing a plurality of call origination requests, in accordance with various embodiments of the present invention. To describe FIG. 2, reference will be made to FIG. 1, although it should be understood that the described method can be implemented in any other suitable environment as well. Moreover, the invention is not limited to the order in which the steps are listed in the described method.

At step 202, the method for managing the plurality of call origination requests is initiated. As already explained in FIG. 1, a call origination request is generated when the user of a first communication device dials the communication number of a second communication device on his or her device. In this case, the call origination request is generated by the first communication device, indicating that the user of the first communication device wants to communicate with the user of the second communication device. For example, if Tom wants to communicate with Peter, Tom would need to dial the mobile number of Peter's mobile phone on his mobile phone. After the mobile number has been dialed on Tom's mobile phone, it generates a call origination request indicating that Tom wants to communicate with Peter.

At step 204, a plurality of call origination requests are received by a base station from a plurality of communication devices. The plurality of call origination requests corresponds to the plurality of communication devices. For example, if there are six communication devices generating call origination requests, the base station receives six call origination requests corresponding to the six communication devices.

At step 206, the plurality of call origination requests are queued, based on a predefined policy, when the base station is operating in the congestion mode. The predefined policy can be, for example, the first-in first-out policy. As explained in FIG. 1, the base station is said to be operating in the congestion mode when the number of call origination requests received by it is greater than the maximum number of call origination requests it can handle. For example, if the maximum number of call origination requests the base station can handle is eight, and it receives 10 call origination requests, the base station is said to be operating in the congestion mode.

If the base station is operating in the congestion mode and a plurality of call origination requests are received by the base station, the base station queues all the call origination requests on a first-in, first-out basis, rather than rejecting the call origination requests, as explained in FIG. 1. This is better understood with the help of the following example. Consider a case when the maximum number of call origination requests the base station can handle is eight and it receives 10 call origination requests. The base station serves the first eight call origination requests and queues the next two call origination requests on a first-in, first-out basis. For example, the ninth call origination request is queued before the tenth.

At step 208, each call origination request is processed based on the queued plurality of call origination requests. Continuing with the earlier example, if the ninth and the tenth call origination requests are queued on a first-in, first-out basis, the ninth call origination request is processed before the tenth. The entire procedure for processing a call origination request is explained in detail in FIG. 3. At step 210, the method for managing the plurality of call origination requests is terminated.

Figure 3:
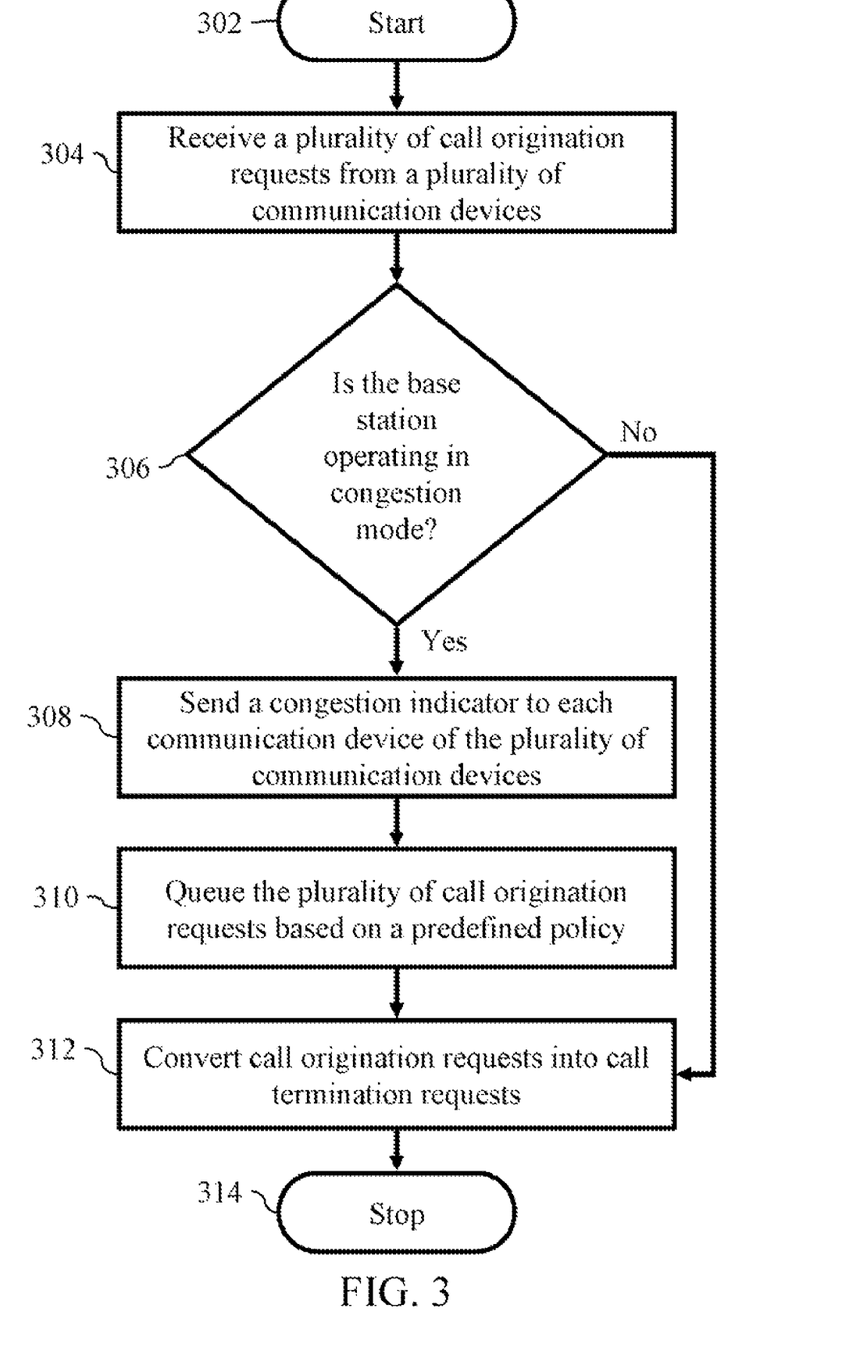
FIG. 3 is a flow diagram illustrating a method for managing a plurality of call origination requests, in accordance with an embodiment of the present invention.

FIG. 3 is a flow diagram illustrating a method for managing a plurality of call origination requests, in accordance with an embodiment of the present invention. To describe FIG. 3, reference will be made to previous figures, although it should be understood that the described method can be implemented in any other suitable environment as well. Moreover, the invention is not limited to the order in which the steps are listed in the described method.

At step 302, the method for managing the plurality of call origination requests is initiated. The concept of 'call origination requests' has already been explained in FIG. 1. At step 304, a plurality of call origination requests is received by a base station from a plurality of communication devices. As explained in FIG. 2, the received plurality of call origination requests corresponds to the plurality of communication devices.

At step 306, it is determined whether the base station is operating in the congestion mode. As explained in FIG. 1, the base station is said to be operating in the congestion mode when the number of call origination requests it is serving is more than or equal to the maximum number of call origination requests it can handle. For example, if the maximum number of call origination requests a base station can handle at a particular time is eight, and it is serving eight or more call origination requests, the base station is said to be operating in the congestion mode.

At step 308, a congestion indicator is sent to the plurality of communication devices, when it is determined that the base station is operating in the congestion mode. Continuing with the example of the previous paragraph, the maximum number of call origination requests the base station can handle is eight. Now, consider a situation when the base station is operating in the congestion mode and is serving eight call origination requests simultaneously. If the base station receives another call origination request at this particular time, it sends a congestion indicator to the communication device sending the call origination request. For example, the base station may send the message, "The network is busy." to the communication device. If the base station receives more call origination requests, the same message is sent to all the communication devices sending their call origination requests.

At step 310, the plurality of call origination requests are queued based on a predefined policy when the base station is operating in the congestion mode. The call origination requests that exceed the maximum number of call origination requests that can be handled by the base station 104 are queued, based on a predefined policy. As mentioned in FIG. 2, the predefined policy can be, for example, the first-in first-out policy. The entire process of queuing the plurality of call origination requests has already been explained in FIG. 2.

For one embodiment, if a call origination request from a particular communication device has been queued, further call origination requests from that communication device are rejected by the base station. This is better understood with the help of the following example. Consider a case where there has been a terrorist attack and many people are calling their friends and families to enquire about their well-being. In such a case, the base station may get overloaded and start functioning in the congestion mode. Further, assume that Tom is trying to call Peter by dialing Peter's mobile number on his mobile phone. Since the base station is functioning in congestion mode, Tom will get a message saying "The network is overloaded." Subsequently, the base station will queue the call origination request from Tom's mobile phone on a first-in, first-out basis. Now, assume that Tom again tries to call Peter again, and thus, a second call origination request is received by the base station from Tom's mobile phone. In such an event, the base station determines that a call origination request from Tom's mobile phone has already been queued, and therefore, rejects the second call origination request from Tom's mobile phone. Any further re-tries by Tom to call Peter are also rejected by the base station.

At step 312, a call origination request corresponding to a communication device is converted into a call termination request when the base station is operating in the congestion mode. The conversion of the call origination request into a call termination request depends on the queued call origination requests. For one embodiment, the step 312 is an extension of the step 208, as explained in FIG. 2. To understand the step 312 better, consider a case when the base station is functioning in the congestion mode, and three call origination requests are queued on a first-in, first-out basis. In other words, the call origination requests are queued such that the first request is processed before the second and the second request is processed before the third.

The method of processing a call origination request begins by first converting it into a call termination request. For one embodiment, a paging indicator power level on a QPCH is adjusted based on a parameter. The said parameter can be, for example, the congestion level at the base station or the type of the call origination request. This is better understood with the help of the following explanation.

Typically, when the base station is not operating in the congestion mode and a call origination request from a first communication device, to communicate with a second communication device, is received by the base station, it sends a termination request to the second communication device. This call termination request is sent at a particular paging indicator power level via the QPCH. For example, the base station may send the call termination request at a paging indicator power level of eight units. When the call termination request is received by the second communication device, it sends a paging response to the base station, indicating that the second communication device is 'ready' to communicate with the first communication device.

However, if the base station is operating in the congestion mode, and a number of call origination requests have been queued, then the base station adjusts the paging indicator power level on a per-call-origination-request basis. For example, the base station may reduce the paging indicator power level to, for instance, four units when the service option of the corresponding call origination request corresponds to a 'data call'. Similarly, the base station may reduce the paging indicator power level to, for instance, six units when the service option corresponds to a 'voice call'. The figures of four and six may indicate that voice calls are given preference over data calls.

As mentioned earlier, the base station may adjust the paging indicator power level based on the congestion level at the base station. For example, the base station may reduce the paging indicator power level to, for instance, five units when the number of queued call origination requests exceeds eight.

After the base station reduces the paging indicator power level, a termination request is sent to the second communication device at the reduced power level via the QPCH. However, the second communication device is able to respond to the termination request only if it is in a good network coverage area. For example, if the second communication device is in a network coverage area where the minimum paging indicator power level needs to be seven units to receive a termination request, and the reduced power level is four the second communication device will not be able to receive the termination request. Consequently, the device will be unable to respond to the termination request. On the other hand, if the second communication device is in a good network coverage area, where the minimum paging indicator power level needs to be three, then the second communication device will receive the termination request and thus, it will be able to respond to the request. When the second communication device responds to the termination request, the base station will establish the call session between the first communication device and the second communication device.

For one embodiment, the base station also sends a 'call request' to the first communication device to establish a call session between the first communication device and the second communication device, This takes place after the base station receives a response from the second communication device, indicating that it has received the call termination request. This is better understood with the help of the following example.

Consider a situation where Tom wants to communicate with Peter. Tom dials Peter's mobile number on his mobile phone, and thus, a call origination request is received by the base station from Tom's mobile phone. Further, assume that the base station is operating in the congestion mode. Now, Tom's call origination request will be queued by the base station and he will get a message, "The network is busy." Consequently, Tom will disconnect his mobile phone and will wait for the network to be free again. However, at the base station, Tom's call origination request will be processed when its 'turn' comes up. At that time, the base station will send a call termination request to Peter's mobile phone, and if Peter's mobile phone responds to the call termination request, the base station will send a 'call request' to Tom's mobile phone, indicating that the call can now take place. From Tom's point of view, it will be like the base station calling his mobile phone to convey him that he can call Peter now.

For one embodiment, it can be said that the method, as described in the FIG. 3, is performed to select only those communication devices from the plurality of communication devices that are in a predefined network coverage areas. As explained earlier, only those communication devices are selected for establishing communication that respond to the termination request at the adjusted paging indicator power level. For one embodiment, the predefined network coverage areas are the areas where the network coverage is good. For example, if a first area has 'good' network coverage and a second area has 'average' network coverage, the base station will be able to select only those communication devices, for establishing communication, which belong to the first area rather than the second area. This is because only the communication devices belonging to the first area will be able to respond to the termination request.

Those with ordinary skill in the art will appreciate that the figures of four units, five units, etc., corresponding to the paging indicator power level are exemplary in nature and the working of the present invention will not change, even if these figures are different from the ones mentioned. Further, if it is determined at step 306 that the base station is not operating in the congestion mode, the steps 308 and 310 will not take place. In this case, the base station will operate in the normal mode, and therefore, the call session will be established directly after the step 306. At step 314, the method for managing the plurality of call origination requests is terminated.

Figure 4:
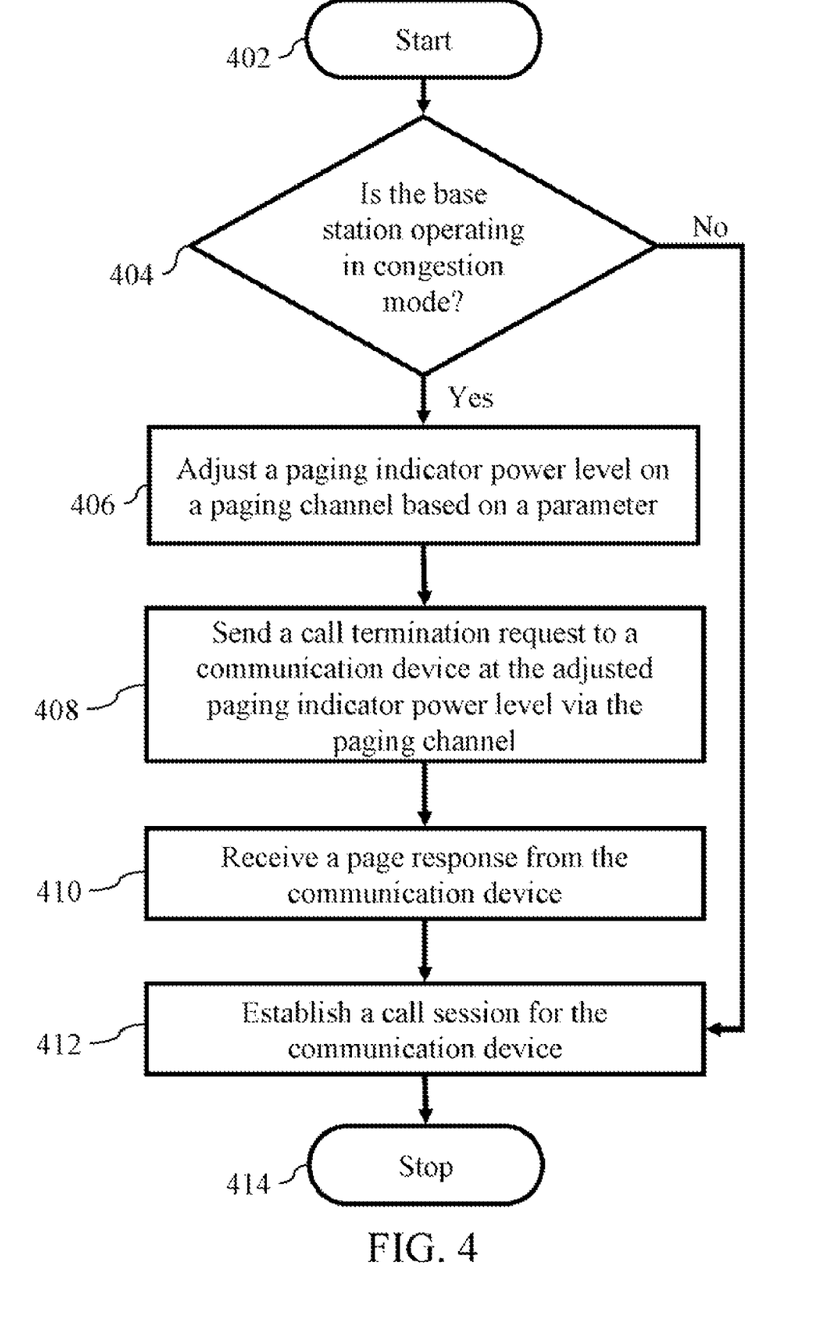
FIG. 4 is a flow diagram illustrating a method for managing a call termination request for a communication device, in accordance with various embodiments of the present invention.

FIG. 4 is a flow diagram illustrating a method for managing a call termination request for a communication device, in accordance with various embodiments of the present invention. To describe FIG. 4, reference will be made to previous figures, although it should be understood that the described method can be implemented in any other suitable environment as well. Moreover, the invention is not limited to the order in which the steps are listed in the described method.

At step 402, the method for managing the call termination request for the communication device is initiated. As explained in FIG. 3, a call termination request for a communication device is generated by a base station, when a call origination request for that communication request is received by the base station. For example, if a first communication device sends a call origination request for a second communication device to the base station, the base station converts the received call origination request to a call termination request and sends it to the second communication device. The concept of a 'call origination request' and a 'call termination request' has already been explained in previous figures.

At step 404, it is determined whether the base station is operating in the congestion mode. As already explained in previous figures, a base station is said to be operating in the congestion mode when the number of call origination requests it is serving equals to the maximum number of call origination requests it can serve. For example, if a base station can serve eight call origination requests, and, at a particular time, it is serving eight requests, it is said to be operating in the congestion mode.

At step 406, the paging indicator power level on a paging channel is adjusted, based on a parameter, when it is established at the step 404 that the base station is operating in the congestion mode. For one embodiment, the paging channel is the QPCH and adjusting the paging indicator power level on the paging channel is same as reducing the paging indicator power level on the QPCH. Further, as explained in FIG. 3, the parameter for controlling the paging indicator power level can be, for example, the congestion level at the base station or a service option of the call origination request corresponding to the call termination request for the communication device. The entire process of adjusting the paging indicator power level, based on the parameter, has already been explained at the step 312 of FIG. 3.

At step 408, a call termination request for a communication device is sent to the communication device at the adjusted paging indicator power level via the paging channel. For example, if the paging indicator power level is adjusted to the value of four units at the step 406, then the call termination request is sent to the communication device at that power level via the QPCH.

At step 410, a page response is received by the base station from the communication device when the communication device receives the call termination request. For one embodiment, the call termination request is received by the communication device only when the device is in a good network coverage area. This is better understood with the help of the following explanation.

When the base station is operating in the congestion mode, it reduces the paging indicator power level so that only those communication devices that are in good network coverage areas are able to receive call-termination request. For example, the base station can reduce the paging indicator power level to a level of, for instance, three units and send the call termination request at this power level. However, the communication devices that are in areas where the minimum required paging indicator power level is greater than three are not able to receive this call termination request. For example, if a communication device is in an area where the minimum required paging indicator power level for receiving a termination request is 'seven' units, the communication device cannot receive the call termination request at the paging indicator power level of three units.

Those communication devices that are in good network coverage areas will receive the call termination request at the reduced paging indicator power level and they can send a page response to the base station in response to the termination request. A page response acts as an indication to the base station that a call termination request has been received by the communication device and that the communication device is 'ready' for a call session. In other words, the page response indicates that the communication device is capable of establishing the call session at the reduced paging indicator power level.

At step 412, a call session is established for the communication device by the base station when the page response is received by the base station. The step 412 is better understood with the help of the following example. Consider a situation where a base station receives a call origination request from a first communication device to communicate with a second communication device. After receiving the call origination request, the base station determines whether it is operating in the congestion mode. When it is established that the base station is operating in the congestion mode, the base station reduces the paging indicator power level, based on the parameters described earlier, and sends a call termination request to the second communication device at the reduced paging indicator power level via the QPCH. If the second communication device is in a good network coverage area, it receives the call termination request sent by the base station. After receiving the call termination request, the second communication device sends a page response to the base station indicating that the second communication is 'ready' for communication. Thereafter, after receiving the page response, the base station establishes a call session between the first communication device and the second communication device.

For one embodiment, if it is determined at step 404 that the base station is not operating in the congestion mode, the steps 406, 408 and 410 do not take place. In this case, the base station operates in the normal mode, and therefore, the step 412 takes place directly after the step 406. At step 414, the method for managing the call termination request for the communication device is terminated.

Figure 5:
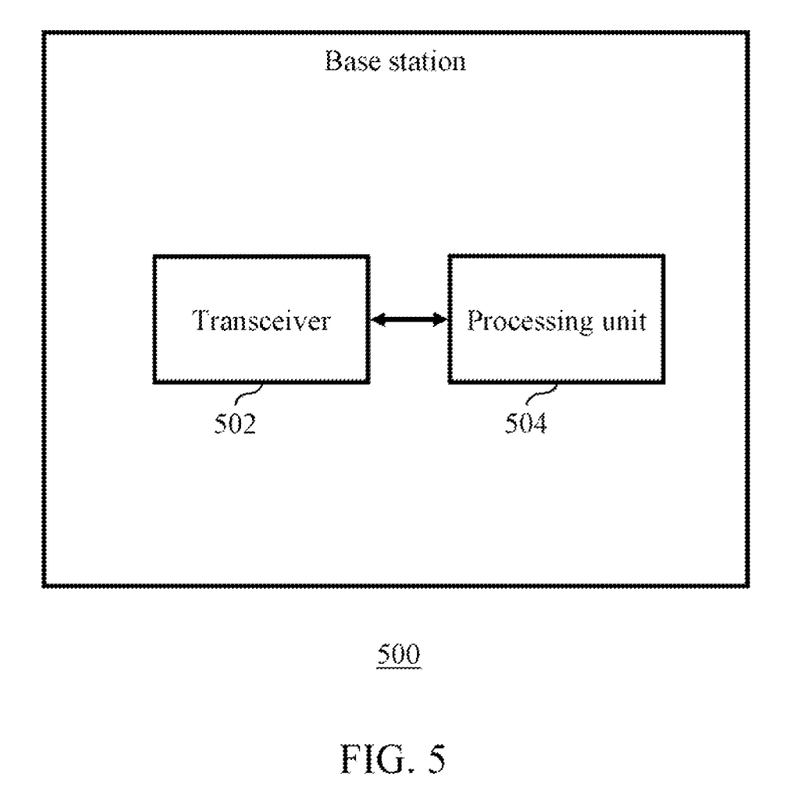
FIG. 5 illustrates a block diagram of an exemplary base station, in accordance with various embodiments of the present invention.

FIG. 5 illustrates a block diagram of an exemplary base station 500, in accordance with various embodiments of the present invention. Those skilled in the art will appreciate that the base station 500 may include all or a few of the components shown in FIG. 5. Further, those ordinarily skilled in the art will understand that the base station 500 may include additional components that are not shown here, since they are not germane to the operation of the base station 500, in accordance with the inventive arrangements. To describe the base station 500, reference is made to previous figures, although it should be understood that the base station 500 can be used in any other suitable environment or network.

The base station 500 can include a transceiver 502 and a processing unit 504. For one embodiment, the transceiver 502 and the processing unit 504 are connected to each other. The transceiver 502 can be configured to receive a plurality of call origination requests from a plurality of communication devices. The concept of 'call origination request' has already been explained in FIG. 1. Further, as mentioned in FIG. 2, the received plurality of call origination requests corresponds to the plurality of communication devices.

When a call origination request is received by the transceiver 502, the processing unit 504 determines whether the base station 500 is operating in the congestion mode. As described in previous figures, a base station is said to be operating in the congestion mode when the number of call origination requests it is serving is equal to the maximum number of call origination requests it can handle. When the processing unit 504 determines that the base station 500 is operating in the congestion mode, the processing unit 504 queues the received call origination request on a first-in, first-out basis. For example, if the processing unit 504 determines that the base station 500 is operating in the congestion mode, and two call origination requests are received by the transceiver 502, the processing unit 504 queues the two call origination requests in such a manner that the first call origination request is processed before the second.

The processing unit 504 is also configured to process each call origination request of the queued call origination requests. As mentioned in the previous paragraph, the queued call origination requests are processed on a first-in, first-out basis. Further, as explained in FIG. 2 and FIG. 3, the method for processing the call origination requests includes converting them into call termination requests. For one embodiment, to convert a call origination request into a call termination request, the processing unit 504 adjusts a paging indicator power level on a paging channel based on a parameter. For one embodiment, the paging channel can be the QPCH. The said parameter can be, for example, the congestion level at the base station 500 or the service option of the call origination request. The entire process of converting a call origination request into a call termination request, followed by the processing unit 504, has already been explained in FIG. 3.

When the processing unit 504 converts a call origination request into a call termination request, the transceiver 502 sends the call termination request to the corresponding communication device at the adjusted paging indicator power level. As described in FIG. 4, the paging indicator power level is adjusted such that only those communication devices that are in 'good' network coverage areas are able to receive the call-termination request. Consequently, if the communication device is in a good network coverage area, the communication device receives the call termination request and sends a page response back to the base station 500. The page response acts as an indicator to the base station 500 that the communication device has received the call termination request and is ready for communication. For one embodiment, the processing unit 504 is configured to receive, via the transceiver 502, the page response that the communication device sends to the base station 500.

When the page response is received by the base station 500, the processing unit 504 establishes a call session for the communication device sending the page response. This call session is established between the communication device that sent the call origination request and the communication device that sent the page response. The method for establishing a call session between two communication devices has already been explained at the step 412 of the FIG. 4.

Apart from the functions described above, the processing unit 504 can also be configured to perform other functions. For example, the processing unit 504 can be configured to reject a re-sent call origination request from a communication device that has already sent one, and its initial call origination request is still in the queue. In other words, when a particular call origination request, for instance, a first call origination request, is queued by the processing unit 504, any further call origination requests from the same communication device that made the first call origination request is rejected by the processing unit 504. For example, if a communication device makes a call origination request to the base station 500, and the request is queued by the processing unit 504, any further call origination requests are rejected by the processing unit 504 till the earlier call origination requests in the queue have been processed.

The processing unit 504 can also be configured to send a congestion indicator to a communication device, via the transceiver 502, when the base station 500 is operating in the congestion mode. This is better understood with the help of the following example. Consider a situation when the base station 500 is operating in the congestion mode, and a communication device sends a call origination request to the base station 500. The processing unit 504 queues the call origination request and then sends a congestion indicator or a message to the communication device, indicating its congestion status. The message can be, for example, "The network is busy."

Various embodiments, as described above, provide a method and apparatus for managing calls in wireless communication networks. The present invention enables a base station to selectively serve only those call session requests that belong to communication devices in good network coverage areas. Consequently, the total number of call session requests that a base station can handle increases during high congestion periods. This helps users who are trying to communicate with their families and friends in emergency situations such as a natural disaster, an accident or a terrorist attack. Further, the present invention enables the base station to reject re-tried call attempts by the same user, and thereby, helps to save the resources of the base station.

It will be appreciated that embodiments of the invention described herein may comprise one or more conventional processors and unique stored program instructions that control the one or more processors, to implement, in conjunction with certain non-processor circuits, some, most or all of the functions of the embodiments of the invention described herein. The non-processor circuits may include, but are not limited to, a radio receiver, a radio transmitter, signal drivers, clock circuits, power-source circuits and user-input devices. Some or all the functions can be implemented by a state machine that has no stored program instructions, or in one or more application-specific integrated circuits (ASICs), in which each function or some combinations of certain of the functions are implemented as custom logic. Of course, a combination of these approaches can be used. Thus, means for these functions have been described herein. In situations where functions of the embodiments of the invention can be implemented by using a processor and stored program instructions, it will be appreciated that a means for implementing such functions is the media that stores the stored program instructions, be it magnetic storage or a signal conveying a file. Further, it is expected that one with ordinary skill, notwithstanding possibly significant effort and many design choices motivated by, for example, available time, current technology and economic considerations, when guided by the concepts and principles disclosed herein, will be readily capable of generating such stored program instructions and ICs with minimal experimentation.

In the foregoing specification, the invention and its benefits and advantages have been described with reference to specific embodiments. However, one with ordinary skill in the art will appreciate that various modifications and changes can be made, without departing from the scope of the present invention, as set forth in the claims. Accordingly, the specification and the figures are to be regarded in an illustrative rather than a restrictive sense, and all such modifications are intended to be included within the scope of the present invention. The benefits, advantages, solutions to problems, and any element (s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

The Abstract of the disclosure is provided to comply with 37 C.F.R. §1.72(b), which requires an abstract that enables a reader to quickly ascertain the nature of the technical disclosure. It is submitted with the understanding that it will not be used to interpret or limit the scope or meaning of the claims. In addition, it can be seen in the foregoing Detailed Description that various features are grouped together in a single embodiment, for the purpose of streamlining the disclosure. This method of disclosure is not to be interpreted as reflecting an intention that the claimed embodiments require more features than are expressly recited in each claim. On the contrary, as the following claims reflect, the inventive subject matter lies in less than all the features of a single disclosed embodiment. Thus, the following claims are hereby incorporated into the Detailed Description, with each claim standing on its own as a separately claimed subject matter.

What is claimed is:

1. A method for managing a plurality of call origination requests, the method comprising:
    receiving the plurality of call origination requests from a plurality of communication devices;
    queuing the plurality of call origination requests based on a predefined policy when a base station is operating in a congestion mode; and
    processing each call origination request of the plurality of call origination requests based on the queued plurality of call origination requests, wherein processing each call origination request comprises converting a call origination request into a call termination request when the base station is operating in the congestion mode, further wherein converting the call origination request to the call termination request comprises:
        adjusting a paging indicator power level on a quick paging channel based on a parameter; and
        sending the call termination request to a communication device corresponding to the call origination request at the adjusted paging indicator power level via the quick paging channel.

2. The method as recited in claim 1, wherein queuing the plurality of call origination requests comprises determining whether the base station is operating in the congestion mode.

3. The method as recited in claim 1, wherein the predefined policy is a first-in, first-out policy.

4. The method as recited in claim 1 further comprising sending a congestion indicator to the plurality of communication devices when the base station is operating in the congestion mode.

5. The method as recited in claim 1 further comprising selecting one or more communication devices from the plurality of communication devices using the adjusted paging indicator power level, wherein the one or more communication devices are in a predefined coverage area.

6. The method as recited in claim 1, wherein the parameter controlling the paging indicator power level comprises at least one of a level of congestion at the base station and a service option of the call origination request.

7. The method as recited in claim 1 further comprising rejecting a re-sent call origination request from one or more communication devices of the plurality of communication devices when a previous call origination request corresponding to the one or more communication devices has been queued.

8. A base station comprising:
    a transceiver configured to:
        receive a plurality of call origination requests from a plurality of communication devices; and
        send a call termination request to a communication device of the plurality of communication devices; and
    a processing unit configured to:
        determine whether the base station is operating in a congestion mode;
        queue the plurality of call origination requests based on a predefined policy when the base station is operating in the congestion mode;
        process each call origination request of the plurality of call origination requests based on the queued plurality of call origination requests;
        adjust a paging indicator power level on a paging channel based on a parameter when the base station is operating in the congestion mode, wherein the paging channel is utilized for sending a call termination request for establishing a call; and
        reject a re-sent call origination request from one or more communication devices from the plurality of communication devices when a previous call origination request corresponding to the one or more communication devices has been queued.

9. The base station as recited in claim 8, wherein the paging channel is a Quick Paging Channel (QPCH).

10. The base station as recited in claim 8, wherein the processing unit is further configured to send, via the transceiver, a congestion indicator to the plurality of communication devices when the base station is operating in the congestion mode.

11. The base station as recited in claim 8, wherein the processing unit is further configured to receive, via the transceiver, a page response from the communication device after the call termination request is accepted by the communication device.

12. The base station as recited in claim 11, wherein the processing unit is further configured to establish a call session for the communication device after the page response is received.

* * * * *